Oct. 4, 1960
R. E. BROWN
2,954,615
ART PAINTING KIT
Original Filed May 18, 1955
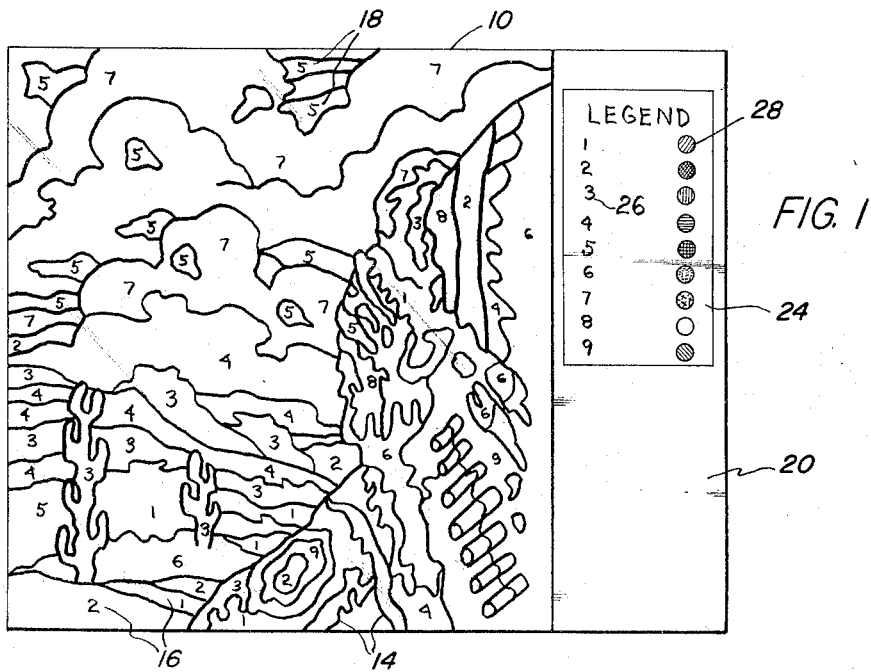
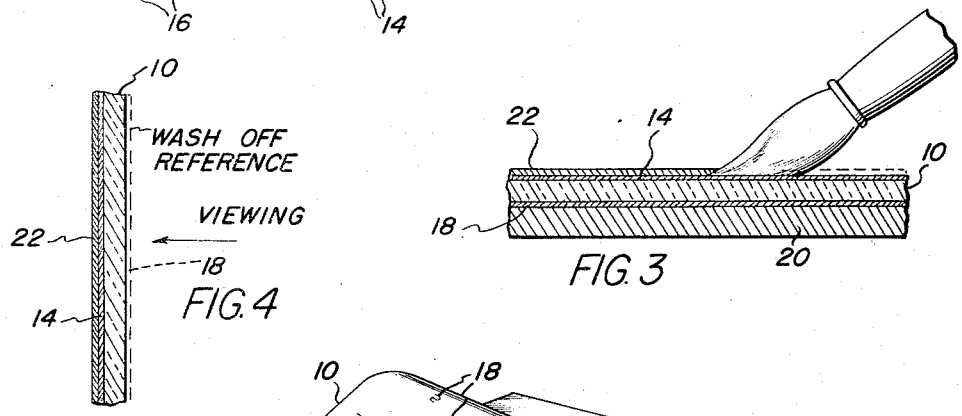
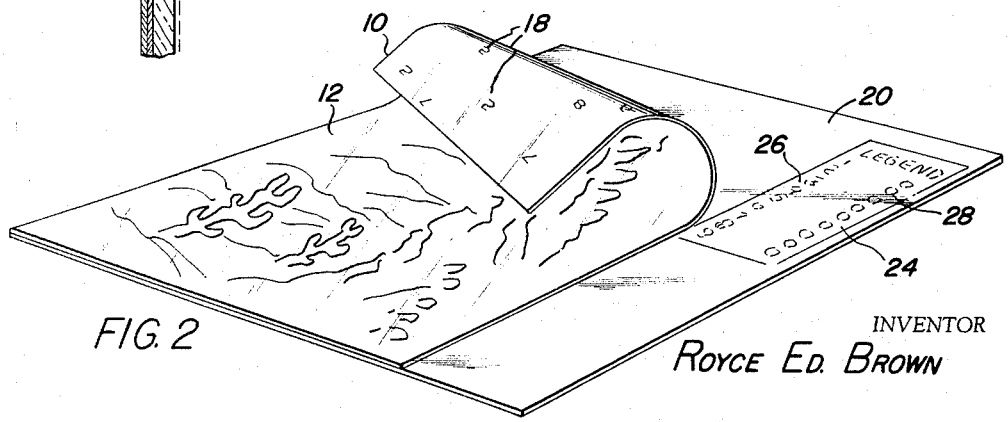
INVENTOR
ROYCE ED. BROWN
BY *Frederick C. Bromley*
ATTORNEY

United States Patent Office 2,954,615
Patented Oct. 4, 1960

2,954,615

ART PAINTING KIT

Royce Ed. Brown, 14 Whitby St., Toronto, Ontario, Canada, assignor of one-half to Frederick C. Brown, Strathroy, Ontario, Canada Original application May 18, 1955, Ser. No. 509,340. Divided and this application July 20, 1959, Ser. No. 828,191

4 Claims. (Cl. 35—26)

This invention relates to art devices, and in particular to those of the type which provide means for guiding a relatively unskilled artist in the production of a picture.

The invention may take form of a game, a toy for the entertainment of children or adults, or as an aid in the training of unskilled persons in the arts of painting and/or decoration, and comprises a division of my co-pending application Serial No. 509,340, filed May 18, 1955, now abandoned.

Prior art picture and/or painting guides suffer from the defects that they either include indicia which completely define all the important features of a picture with such effect as to dominate the "line" of the finished picture, thereby leaving the artist little or no opportunity to develop artistic skill, or else they provide completely inadequate information so that the unskilled artist is discouraged and unable to produce a good picture.

It is an object of the invention to provide an art guide including a pre-planned arrangement of aids of such ingenuity that they provide adequate assistance to enable an unskilled person to produce a picture of good artistic quality but without leaving on the finished effort any evidence of the fact that the artist's hand and mind received any outside guidance.

It is further an object to provide pre-planned a painting sheet of the kind discussed wherein a feature of the aiding device is so arranged as to ensure that when a plurality of differing colors or tones are positioned to have tangent edges, a "line" is provided to define the change from one color or tone to another.

It is a still further object to provide an art guide and painting medium wherein those agencies designed to insure that the finished picture will possess the character known to skilled painters as "draughtsmanship" will be depicted along with other indicia provided to assist the tyro artist and which in themselves will be divorced from the finished picture by means provided therefor.

In another aspect it is proposed to provide a pre-planned painting sheet having an initially transparent or at least translucent work surface which includes on one side an arrangement of indicia positioned to define lines of demarkation between tones of at least the principal details of interest and on the other side, indicia pre-planned and set down as guides to define form, color, tone and the like.

The indicia defining the said painting aids are disposed on one surface of the transparent painting sheet itself and are so applied that they may be erased from that surface when a painting has been executed upon the opposite face of the said transparent painting sheet.

The permanent indicia defining "line" in the finished picture are imprinted upon the back surface of the transparent sheet and the picture is painted on this same side, in reverse attitude so that the finished picture in correct attitude is observed by viewing the paint work through the transparent surface.

In the ensuing description and claims it is to be understood that the term "painting aid" refers to an arrangement of lines, hatching, numbers, tabulation and/or other indicia designed to comprise instructions to the artist as to how and where color or lining should be set down on the painting surface. These aids may also include sample colors and color combinations set down as a guide for the selection and preparation of pigments or the like, and may further include written instructions as to the order in which pigments are to be applied.

In sharp distinction to these painting aids there are configurations imprinted upon one of the transparent surfaces designed to define painting boundaries and to provide demarkation areas or as it were, "no man's lands" between color patches so that the unskilled artist need not exert great effort in defining the edges of a color patch. These lines will normally be opaque and of appropriate widths such as to completely mask any roughness of edge resulting from the unskilled work of the tyro artist. In addition these permanent configurations ensure good draughtsmanship in the execution of the picture and since they are not removed when the picture is finished they give to the work a character which artists call good "line." When artists refer to a picture as having good line they mean that it is of excellent draughtsmanship and that the features of the principal interest are sharply defined, and that the picture is free from vague indefiniteness in its important details. Therefore, these permanent configurations are called "line defining indicia," for the purposes of this specification to distinguish them from painting aids which are not incorporated per se in the finished picture.

Whatever indicia of a guidance character are imprinted upon the viewing face they will be so devised that they can be washed off completely by simple means such as soapy water when the picture has been completed.

It is feasible also to imprint the line defining indicia upon the viewing face of the transparent sheet. In some cases this may be desirable but, as a rule, I prefer to print the line defining indicia upon the painting side of the sheet.

In the present specification and claims, the painting sheet is referred to as "transparent." In simple constructions a plain sheet of transparent or so called "clear" material of the kind marketed by the proprietors under the trade name "Lucite" is preferred. However, in more advanced and complicated art work it has been found desirable to tint the painting sheet or to include therein a pigment which makes it translucent rather than transparent, and such variations of materials permitting light to pass therethrough are to be regarded as included when the painting medium is defined to include a "transparent" sheet.

The invention will now be further delineated by the following description of a typical example of construction the text being aided by reference to the accompanying drawings wherein:

Figure 1 is a plan view of the invention disclosing a transparent sheet disposed on a backing card or plate which includes a color coated information index for the painter correlated with washable numerical indicia readable at the back side of the transparent sheet and imprinted on the front or viewing side thereof, the sheet including permanent line defining indicia on the back side of the same;

Figure 2 is a perspective view with the work sheet folded back to better disclose the construction;

Figure 3 is an enlarged fragmentary section illustrating the manner in which a painting is produced by utilizing the invention; and Figure 4 is a view similar to Figure 3 showing the work sheet removed from the backing sheet, and indicating the washable indicia by means of a dotted line.

Referring to the drawing in detail, a transparent work sheet is indicated at 10, this sheet being constructed from a suitable transparent or light penetrating material such as glass, plastic or the like. The work sheet 10 has formed on the back side or surface 12 a plurality of linear indicia 14 which are relatively thick, see Figure 1, and define at the intersections various areas to have different colors, these areas being indicated at 16 and being identified by numerical indicia 18 which is visible through the back side of the work sheet. It will be noted that the numerical indicia 18 is formed on the front side or viewing surface of the work sheet and will comprise a washable ink, paint or the like.

Indicated at 20 is a backing sheet, preferably of a clear white relatively stiff cardboard upon which the work sheet 10 will be secured, the backing sheet aiding in reading and the application of the paint 22 which will be applied in the various separate areas 16. Inscribed on the backing sheet 20 in a readily visible position is a legend 24 which includes a plurality of numerical indicia 26 aligned with colored indicia 28 to indicate to the artist what the numerical indicia 18 signify.

Thus it will be seen that the indicia 14 and indicia 18 will both be visible from the back side 12 of the work sheet.

It will be evident that one background sheet 20 can be used over and over again for supporting different picture arrangements since the picture detail aids are all on the transparent work sheet while only standardized painting color information is on the back sheet 20. When a painting has been completed upon a media arranged in accordance with Figure 1, the transparent sheet is removed from the back sheet 20 and the painting aid indicia 18 are washed off leaving a clear viewing surface. The relatively thick indicia lines 14 will permit a certain amount of inaccuracy or carelessness on the part of the artist since the various pigments applied in the areas 16 may slightly overlap the lines without extending into the next adjacent section which will have a different color paint disposed therein.

It is to be understood that the form of the invention shown and described is to be taken as a preferred example of the same and that various changes may be made as do not depart from the spirit of the invention or the scope of the appended claims.

What is claimed as new is as follows:

1. A pre-planned artist's painting medium for painting a picture comprising a plurality of material surfaces capable of being positioned in superimposed relation, two of said surfaces being provided by a transparent sheet, an arrangement of painting aid indicia removably imprinted on one of said two surfaces, and an arrangement of line defining indicia imprinted permanently on the other of said two surfaces forming part of the said transparent sheet for registering with said painting aid indicia to complete the pre-planned picture, said line defining indicia being sufficiently wide to permit pigment to be disposed over the margin thereof and yet to provide a well delineated line when viewed through the one of said two surfaces.

2. A pre-planned artist's painting medium for painting a picture comprising three material surfaces capable of being positioned in superimposed relation, one surface forming a background surface, another surface forming a painting surface, and the last surface forming a viewing surface, the two latter surfaces co-acting to comprise a transparent sheet, an arrangement of line defining indicia permanently imprinted upon one of said two latter surfaces of said transparent sheet, and an arrangement of painting aid indicia removably imprinted upon the other of said two latter surfaces of said transparent sheet, said line defining indicia being sufficiently wide to permit pigment to be disposed over the margin thereof and yet to provide a well delineated line when viewed through the other of said two later surfaces which provides said viewing surface.

3. The structure of claim 2; said one surface forming the background surface including an arrangement of painting aid index means thereon.

4. The structure of claim 2; said last surface forming said viewing surface being smooth and presenting a smooth viewing side for a finished picture.

References Cited in the file of this patent

UNITED STATES PATENTS

| | | |
|---|---|---|
| 2,450,127 | Gardener et al. | Sept. 28, 1948 |
| 2,744,349 | Grossman | May 8, 1956 |
| 2,811,800 | Gesek | Nov. 5, 1957 |
| 2,876,574 | Powell | Mar. 10, 1959 |